United States Patent [19]

Kanada et al.

[11] Patent Number: 5,104,635

[45] Date of Patent: Apr. 14, 1992

[54] PROCESS FOR MAKING HYDROGEN PEROXIDE

[75] Inventors: Toshiaki Kanada; Kazunori Nagai, both of Tokyo; Takanari Nawata, Mie, all of Japan

[73] Assignee: Mitsubishi Gas Chemical Company, Inc., Tokyo, Japan

[21] Appl. No.: 575,649

[22] Filed: Aug. 31, 1990

[30] Foreign Application Priority Data

Sep. 1, 1989 [JP] Japan .................. 1-224353

[51] Int. Cl.$^5$ .................................. C01B 15/029
[52] U.S. Cl. .................................... 423/584
[58] Field of Search .................................. 423/584

[56] References Cited

U.S. PATENT DOCUMENTS 4,393,038 7/1983 Sun et al. .................. 423/584
4,996,039 2/1991 Pralus et al. ................ 423/584

FOREIGN PATENT DOCUMENTS 0049809 4/1982 European Pat. Off. .
296357 1/1917 Fed. Rep. of Germany .
120045 10/1919 United Kingdom .

OTHER PUBLICATIONS

Ser. No. 420514 Filed Oct. 12, 1989 (Corresponding to Pat. 4996039).

Primary Examiner—Wayne Langel
Attorney, Agent, or Firm—Wenderoth, Lind & Ponack

[57] ABSTRACT

A process for making hydrogen peroxide by catalytically reacting oxygen with hydrogen in a liquid reaction medium, which comprises (a) filling a reactor with a liquid reaction medium containing a catalyst,
(b) dissolving oxygen and hydrogen in the liquid reaction medium by contacting the gases separately and simultaneously with the liquid reaction medium in the reactor,
(c) thus forming hydrogen peroxide in the liquid reaction medium containing the catalyst,
(d) while maintaining the reactor at such condition that a gaseous phase containing a combination of both oxygen and hydrogen is substantially absent during the reaction, and
(e) separating the catalyst from the resulting reaction mixture containing hydrogen peroxide.

6 Claims, 2 Drawing Sheets

PROCESS FOR MAKING HYDROGEN PEROXIDE

FIELD OF THE INVENTION

This invention relates to an improved process for making hydrogen peroxide through catalytic reaction of oxygen with hydrogen in a liquid reaction medium.

DESCRIPTION OF PRIOR ART

Currently the most widely practiced industrial scale production method of hydrogen peroxide is an autooxidation process employing alkylanthraquinone as the working material.

This process comprises dissolving alkylanthraquinone in an organic working solution to perform reduction, oxidation, separation by aqueous extraction, refining and concentration operations, and is subject to such defects as being complex and requiring high installation and operating costs.

Therefore this process is disadvantageous for small scale production. The process furthermore has the problems of regeneration of hydrogenation catalyst and deterioration of alkylanthraquinone and organic working solution. With the view to solve those problems various novel production processes of hydrogen peroxide other than the above have been proposed, but none of them has yet been reduced to practice. One of the most promising of those novel processes is the attempt to catalytically react oxygen with hydrogen in a liquid reaction medium to produce hydrogen peroxide directly in single stage.

As a typical example of this type of attempt, it has been proposed to supply a pressurized gaseous mixture of oxygen and hydrogen into an acidic aqueous solution in the presence of a metal of platinum group to cause reaction of said gaseous mixture (e.g., see U.S. Pat. Nos. 4,009,252; 4,279,883 and 4,772,458 and Japanese Patent Publication No. 23401/89).

According to these methods aqueous hydrogen peroxide solutions can be obtained at considerably high concentrations, but from the standpoint of their reduction to industrial practice they still leave many problems unsolved.

The Problems to Be Solved by the Present Invention

The most serious of those problems is the risk of explosion of the gaseous mixture of oxygen and hydrogen. It is known that the reaction generally is a catalytic reaction occurring at the solid catalyst surface between the oxygen and hydrogen dissolved in the solution and that the formation rate of hydrogen peroxide is approximately proportional to the hydrogen concentration in the reaction medium. Whereas, it is considered effective for forming hydrogen peroxide with high selectivity to render the oxygen/hydrogen ratio (by volume) to not less than 1, preferably at least 2, because at the ratio below 1, hydrogenolysis of formed hydrogen peroxide becomes vigorous.

Thus for increasing the formation rate of hydrogen peroxide the partial pressure of hydrogen must be raised, which inevitably necessitates high pressure of the total reaction system. The aforesaid Japanese Patent Publication No. 23401/89 and U.S. Pat. No. 4,772,458 employ reaction system pressures of at least 100 Kg/cm$^2$ to obtain hydrogen peroxide at considerably high concentrations.

It is well known that oxygen-hydrogen gaseous mixtures have one of the greatest potentials for explosion. That is, explosible concentration range of oxygen-hydrogen gaseous mixture at normal temperature and pressure is for hydrogen 4.7 (lower limit)–93.9 (upper limit) vol % and for oxygen 95.3 (upper limit)–6.1% (lower limit) vol %. Thus the range is extremely broad. It is also known that dilution of the gaseous mixture with an inert gas like nitrogen scarcely changes the lower limit concentrations of the two gases. Again, within normal ranges of pressure variation (1–200 Kg/cm$^2$) and temperature variation (0°–100° C.) the explosible range is known to undergo little change.

Because operability under safe conditions is imperative for any industrial apparatus, it is considered essential to keep the hydrogen concentration below the lower explosive limit to carry out the reaction safely according to the above-described methods. For maintaining the oxygen/hydrogen ratio within a suitable range and raising the partial pressure of hydrogen while keeping its concentration below the lower explosive limit, it is necessary to raise total pressure of the reaction system using an inert gas like nitrogen. For example, in the working Examples disclosed in aforesaid Japanese patent Publication or U.S. Pat. No. 4,772,458, it was necessary to increase the pressure of total system to at least 600 Kg/cm$^2$ with an inert gas like nitrogen, for keeping the hydrogen concentration at 4 vol % (below the lower explosive limit) while maintaining satisfactory partial pressure of hydrogen. Such high pressures require special high-pressure apparatuses, which per se imposes serious industrial disadvantages.

SUMMARY OF THE INVENTION

Accordingly, therefore, the first object of the present invention is to provide a safe process for making hydrogen peroxide from oxygen and hydrogen, free of danger of explosion, viz., a process wherein oxygen and hydrogen gases are not present as a mixed gaseous phase.

A second object of the present invention is to provide a process for hydrogen peroxide-synthesizing process in which the partial pressure of hydrogen in the reaction system can be effectively increased to readily raise the reaction rate.

Another object of the present invention is to provide a process wherein the total pressure of the reaction system can be relatively lowered when partial pressure of hydrogen in the system is increased.

Still another object of the present invention is to provide a process whereby high concentration hydrogen peroxide solutions can be obtained through relatively simple steps with ease.

A further object of the present invention is to provide a process allowing industrially advantageous production of hydrogen peroxide, not only for large scale production but also with relatively small scale apparatuses.

Other objects and advantages of the present invention will become even more apparent from reading the subsequent explanation.

Means to Solve the Problems

According to our studies, the aforedescribed objects and advantages of the present invention are found to be accomplished by a process for making hydrogen peroxide by catalytically reacting oxygen with hydrogen in a liquid reaction medium, which comprises (a) filling a reactor with a liquid reaction medium containing a catalyst, (b) dissolving oxygen and hydrogen in the liquid reaction medium by contacting the gases separately and simultaneously with the liquid reaction medium in the reactor, (c) thus forming hydrogen peroxide in the liquid reaction medium containing the catalyst, (d) while maintaining the reactor at such condition that a gaseous phase containing a combination of both oxygen and hydrogen is substantially absent during the reaction, and (e) separating the catalyst from the resulting reaction mixture containing hydrogen peroxide.

As already stated, the present process is characterized in that the reaction is carried out in such a manner that oxygen gas and hydrogen gas are not mixed in the reactor but separately contacted with liquid reaction medium containing the catalyst and whereby dissolved into said medium.

Thus in a preferred embodiment of the present invention each of oxygen gas and hydrogen gas are supplied into the liquid reaction medium through a membrane which is gas-permeable but substantially impermeable to said liquid medium. Use of such permselective membrane allows easy dissolution of oxygen gas and hydrogen gas separately into the liquid medium and furthermore enables to maintain high partial pressure of hydrogen without exceedingly increasing the total pressure of the reaction system.

As such membrane utilizable for the separate feeding of oxygen and hydrogen into the liquid reaction medium, any that is gas-permeable but is substantially impermeable to the liquid reaction medium, particularly water, can be used. Microporous membranes can be preferably used for this purpose. As microporous membrane, a macromolecular membrane having a large number of pores of mean diameter ranging from about 0.001—several tens of microns, preferably about 0.01—about 10 microns, can be advantageously used. It is preferred that the high molecular weight materials composing such microporous membranes are hydrophobic polymers, e.g., polytetrafluoroethylene, polypropylene, polysilicone or the like. Such hydrophobic porous membranes are marketed by various sources and easily available.

The form of utilizing such microporous membranes as a partition material is variable depending on such factors as shape and size of the reactor, kind of catalyst, etc., which may be any of flat, tubular or hollow fiber form.

The membranes can be disposed in the reactor in such a manner as to cause contact of the liquid reaction medium containing a catalyst separately with oxygen and hydrogen through the membrane, and then gaseous oxygen and hydrogen can be separately supplied through the membrane to be dissolved in said liquid reaction medium.

In the reaction system of the present invention, it is desirable to make the oxygen/hydrogen ratio at least 2, perferably 3 to 20. For this purpose the gaseous oxygen and hydrogen can be separately suitably mixed with an inert gas such as nitrogen to regulate the oxygen/hydrogen ratio to a preferred range. Air may also be used as an oxygen-containing gas.

As already stated, one of the objects of the present invention is to avoid the risk of explosion of oxygen-hydrogen gaseous mixture. It is necessary, therefore, to so design the reactor as to prevent formation of a gas phase containing a mixture of oxygen and hydrogen in the reaction system. Furthermore, the reactor should have such a construction that even if such a gas phase were formed, it could be immediately discharged. An example of degassing construction is illustrated in FIG. 2 which will be explained later.

Another object of the present invention is to increase partial pressure of hydrogen with higher efficiency than that in conventional gas-liquid mixing process employing oxygen-hydrogen gaseous mixture, viz., to make it possible to produce hydrogen peroxide with high efficiency under lower total pressure of the reaction system than those in conventional systems.

For instance, taking an example of reaction conditions of a gaseous mixture in the gas-liquid mixing process which are:

total pressure: 100 kg/cm$^2$
composition: hydrogen=4.0 kg/cm$^2$ (4.0 vol %) oxygen=20.0 kg/cm$^2$ nitrogen=76.0 kg/cm$^2$
oxygen/hydrogen ratio=5.0 (a non-explosive gas),
approximately equivalent formation rate of hydrogen peroxide to that obtainable in the above run can be obtained by the process of the present invention, for example under the following conditions:
oxygen gas line: oxygen=40 kg/cm$^2$
hydrogen gas line: hydrogen=8 kg/cm$^2$ nitrogen=32 kg/cm$^2$ total pressure=40 kg/cm$^2$
which will render the partial oxygen pressure 20 kg/cm$^2$ and partial hydrogen pressure, 4.0 kg/cm$^2$, in the liquid reaction medium, achieving oxygen/hydrogen ratio of 5.0.

As should be clear also from the above example, it can be understood that the process of the present invention enables production of hydrogen peroxide with high efficiency, at lower total pressures than those required for a conventional gas-liquid mixing process employing the gaseous mixture.

The partial pressures of oxygen and hydrogen in the reaction system of the present invention can suitably range from atmospheric to 100 kg/cm$^2$, preferably 3-50 kg/cm$^2$. The reaction temperature can vary advantageously within a range of from −20° C. to 150° C., preferably from 0° to 70° C.

It is sufficient for the liquid reaction medium to be used in the present invention that it does not interfere with the reaction and is capable of dissolving formed hydrogen peroxide. Normally water, organic solvents or their mixtures are used. It is most advantageous to use water as the liquid reaction medium, because it allows ready separation and purification of hydrogen peroxide and also because hydrogen peroxide is normally stored, transported and used in the form of aqueous solutions.

Various additives may be added to the liquid reaction medium with the view to improve hydrogen peroxide yield and also to inhibit decomposition of formed hydrogen peroxide.

As such additives, those particularly effective are acidic substances which generate hydrogen ion (H+), e.g., HCl, H$_2$SO$_4$, H$_3$PO$_4$, HNO$_3$, etc., or halogen-containing compounds such as NaCl, KCl, NaBr, KBr, CaCl$_2$, NaClO$_3$, NaBrO$_3$, CuBr$_2$, PdBr$_2$, etc.

Amino acids such as valine, norvaline, leucine, norleucine and methionine which are previously proposed by us may also be used.

As stabilizers of hydrogen peroxide, such known substances as, for example, propylenediamine tetra(methylenephosphonic acid), ethylenediamine tetra(methylenephosphonic acid), EDTA and sodium stannate may also be used.

Any catalyst can be used in the subject process so long as it is effective for hydrogen peroxide synthesis through direct reaction of oxygen with hydrogen. Those well known and which are also useful for the present process are the metals of Platinum Metal of the periodic table. More specifically, palladium, ruthenium and platinum can be named as being suitable, particularly palladium and platinum being preferred. Those metals may be used either alone or supported on a solid carrier. The catalyst may be uniformly or non-uniformly disposed in the reaction system. When the catalyst is non-uniformly disposed, the reaction format may be suspension fluidized bed, packed bed, or may follow still other formats. In practicing the present invention, use of non-uniform catalyst with suspension fluidized bed system is desirable for easy separation, recovery and regeneration of the catalyst.

It is a general and desirable practice to support Group VIII metals on solid carriers. As useful carriers, silica gel, silica-alumina, silicic acid, carbon, titania, zirconia, silicon carbide, clay, zeolite and diatomaceous earth, etc. may be named. Methods of having these solid carriers support the metals and of activation are known per se.

BRIEF DESCRIPTION OF DRAWINGS

FIG. 1-2 is a cross-sectional view of its reactor (C) cut along the line X—X' in FIG. 1-1.

FIG. 2 is a schematic view of a suspension fluidized bed-type continuous reaction apparatus for practicing the process of the present invention.

In FIGS. 1-1 and 1-2, the alphabetical labels denote respectively the following:
(A),(B): individual gases
(A')(B'): gas tanks, each 52 ml in capacity
(C): a liquid phase reactor, 16 ml in capacity
(D): a partition membrane member, 3.5 cm² in surface area
(D): a buffer tank
(F): liquid inlet
(G): pressure regulating valve
MS: a magnetic stirrer
(H): a gas-introducing needle valve
(J): a gas-discharging needle valve
(K): a valve
(P): a pressure gauge In FIG. 2, the alphabetical and numeral labels respectively denote the following:
(A),(B) and (C): oxygen gas, hydrogen gas and nitrogen gas, respectively
(1): the reactor
(2): the gas/liquid separating partition membrane member
(3): a buffer tank
(4): a reaction liquid-extracting tank
(5): a catalyst separator
(6): a tank for the product liquid
(7): a gas-mixing tank
(8): a gas-buffer tank
(9): a tank for the feed liquid
(10): a reaction liquid pump
(11): a reaction liquid circulation pump
(12): pressure-regulating valve
(13): pressure-relieving valve Hereinafter the process of the present invention will further be explained referring to the drawings.

DESCRIPTION OF THE PREFERRED EMBODIMENTS

Figure 1:
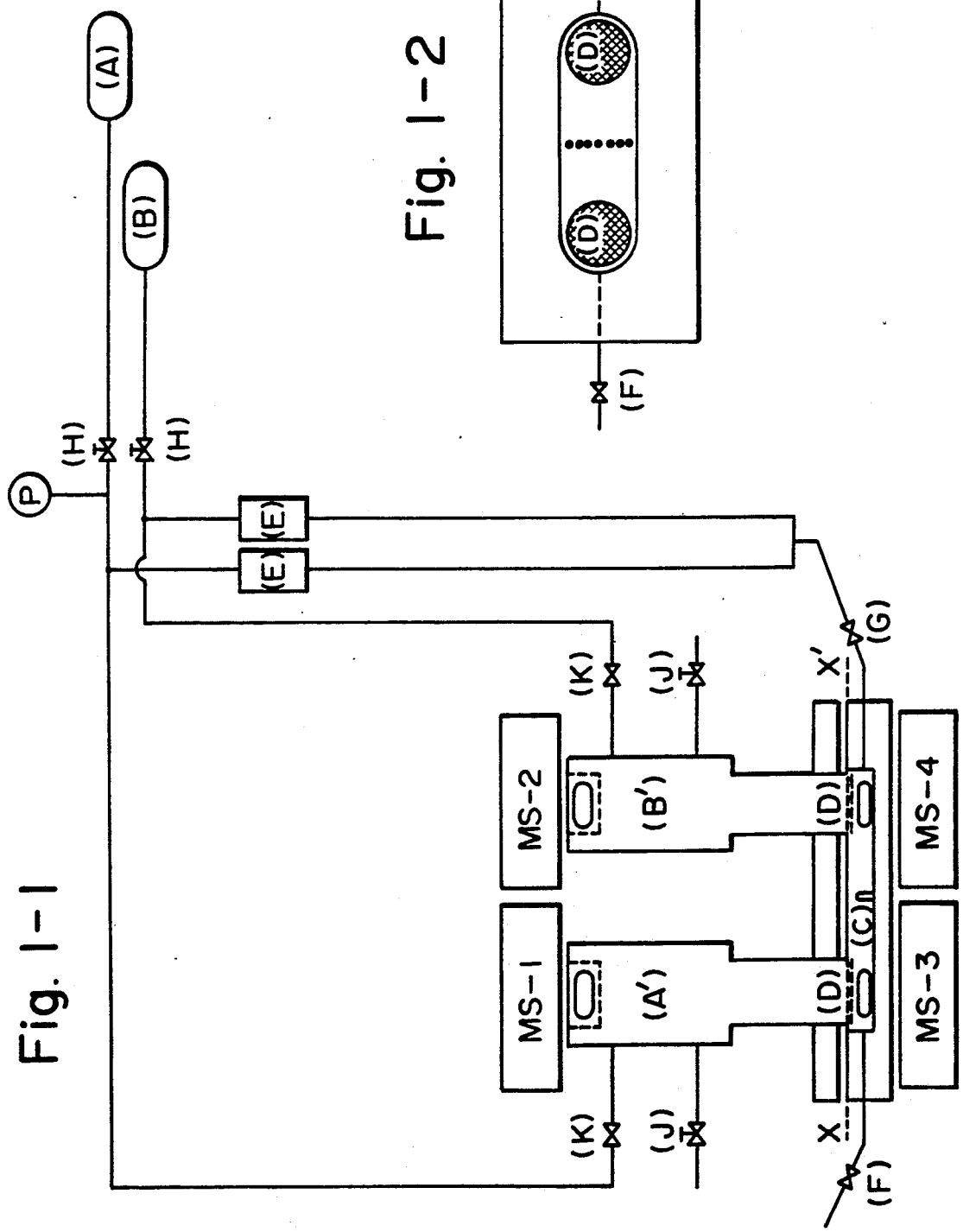
FIG. 1-1 is a schematic view of a batch-type testing reaction apparatus for practicing the process of this invention.
Figure 2:
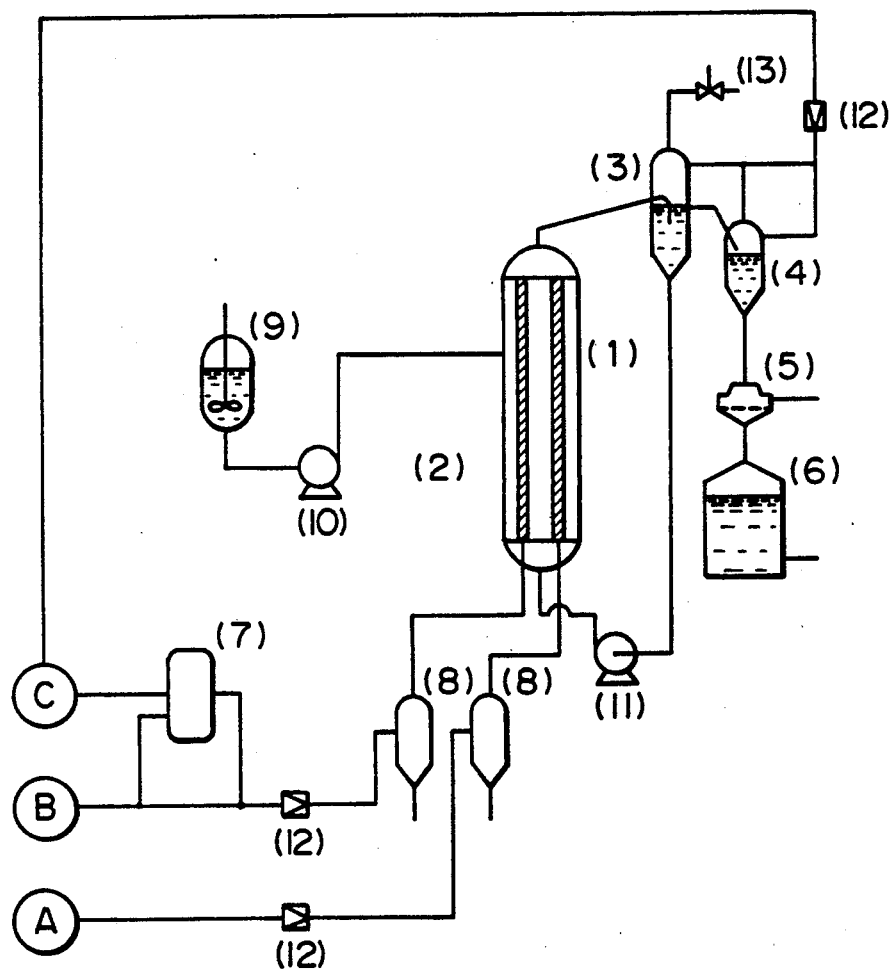

FIG. 1-1 shows a batch-type testing reaction apparatus and FIG. 1-2 is a cross-sectional view of the liquid phase reactor (C) cut along the line X—X' of FIG. 1-1. The reactor (C) is a SUS-316L-made pressure vessel. Cylindrical gas tanks (A' and B') have the structure mountable onto the reactor (C) by screwing. The partition membrane members are mounted on the lower ends of the gas tanks. On the tops of the gas tanks and the reactor set are Teflon-coated magnetic stirrers for mixing. The connecting part of the reactor is perfectly sealed with Teflon packing or O-ring. In the reactor provided are an inlet (F) for the liquid reaction medium and a pressure-regulating valve (G) which is connected to different gas supplies (A) and (B) through two transparent pressure hoses and buffer tanks (E).

Reaction operations are as follows. After feeding a prescribed amount of a catalyst into the reactor, the gas tanks are mounted on the reactor and the liquid reaction medium is fed through the inlet (F), up to the middle level of a transparent pressure hose. The valve (G) is very slightly opened, and under that state the valve (K) is opened to sufficiently purge the gas tanks (A') and (B') with the respective gases (A) and (B). Thereafter the gas-introducing needle valve (H) is adjusted to raise the pressure in the reactor to the prescribed level, while observing the liquid level variation in the transparent pressure hoses so that the pressure should be same in all of the gas tanks and the reactor. Then the needle valve (H) is closed to render the reaction system independent. The reaction is conducted while the magnetic stirrers in the gas tanks and reactor are in action.

After a prescribed period of the reaction at a prescribed temperature, the gases in the gas tanks are purged by opening the gas-discharging needle valve (J) to restore normal pressure. The valve (G) is completely closed, the gas tanks are dismounted, and the reaction liquid in the reactor is analyzed.

FIG. 2 illustrates one example of suspension fluidized bed type continuous reaction apparatus, in which (A), (B) and (C) denote respectively the supplies of oxygen, hydrogen and nitrogen. Hydrogen and nitrogen are mixed in a gas-mixing tank (7) at such a ratio as will bring about the prescribed oxygen/hydrogen ratio. Each of the gases are led to the gas-diffusing pipe-formed partition membrane members (2) in the reactor (1) through the buffer tanks (8). The surface areas of the membrane members should be large enough to secure a reaction rate not lower than the diffusivity of the gases. During the reaction it is sufficient to supplement oxygen and hydrogen only of the amounts corresponding to their consumption.

The liquid reaction medium containing the catalyst is continuously fed into the reactor from a feed liquid tank (9) with a pump (10), to be circulated through the reactor via a buffer tank (3) with a feed liquid circulation pump (11). A portion of the feed liquid is continuously withdrawn from the reactor as overflow and sent through the feed liquid extracting tank (4) into a catalyst separator (5), to be separated into the catalyst and the formed reaction liquid (hydrogen peroxide solution). The reaction liquid is led to a tank (6), and the gaseous phase in the tanks (3) and (4) are filled with inert nitrogen gas to a pressure level equalling the reaction pressure, while monitoring the composition of the gas by such means as gas chromatography, to prevent its hydrogen concentration from exceeding a prescribed level. The composition of gas can be controlled by purging with nitrogen gas. The pressure of the gaseous phase is controlled to the prescribed level with a pressure-regulating valve (12), pressure-relieving valve (13), etc.

EXAMPLES

Hereinafter the present invention will be more specifically explained referring to working and comparative examples in which percents are by weight. Concentration of hydrogen peroxide is determined by potassium permanganate method.

EXAMPLE 1

The reaction was conducted using the SUS-316L-made reaction apparatus shown in FIGS. 1-1 and 1-2, under the reaction conditions indicated in Table 1. After feeding a prescribed amount of a catalyst into the liquid phase reactor of the apparatus of FIGS. 1-1 and 1-2, the gas tanks were mounted on the reactor, and an aqueous solution of prescribed composition was fed into the reactor through the reaction medium-introducing inlet. The gas tanks (A') and (B') were fully purged respectively with oxygen (A) and a gaseous mixture (B) of hydrogen and nitrogen of a prescribed concentration, and then the reactor was pressurized to a prescribed level while adjusting the gas-introducing needle valve. Then the needle valve was closed to make the reaction system independent. The gas phase-liquid phase mixing magnetic stirrers were actuated to initiate the reaction. The reaction temperature was approximately 20° C. After three hours' reaction, the gases were purged to restore normal pressure, the gas tanks were dismounted and the reaction liquid was sampled to be measured of the formed hydrogen peroxide concentration. The results are collectively shown in Table 1.

EXAMPLES 2 AND 3

Reaction was run under similar operating conditions to those in Example 1. The reaction conditions were as shown in Table 1 together with the results.

COMPARATIVE EXAMPLES 1 AND 2

Using the same reaction apparatus to the one used in Example 1, reactions were conducted in a gaseous mixture system of oxygen, hydrogen and nitrogen. The reaction conditions employed and the results were as in Table 1.

Comparative Example 1 was run under the reaction conditions about the same to those of Example 1, but the gaseous mixture had a hydrogen concentration of 10 vol %, a value within explosive range, and was highly dangerous.

Comparative Example 2 employed the same reaction pressure to that in Example 1, but the hydrogen concentration in the gaseous mixture was reduced to 4 vol % by dilution with nitrogen to make the mixture non-explosive.

Effects of the Invention

It is clearly demonstrated by Example 1 and Comparative Example 1 that the separate diffusion and dissolution system of individual gases of the present invention exhibits the reactivity equivalent to, or even higher than, that of gaseous mixture system. It can also be understood upon comparing Example 1 with Comparative Example 2 that the present invention performs the intended reaction with higher safety and efficiency than those of the gaseous mixture system.

Thus the invention can essentially avoid the danger of explosion of oxygen-hydrogen gaseous mixture, raise the partial pressure of hydrogen with better efficiency than that in the gas-liquid mixing system employing the gaseous mixture, and produce hydrogen peroxide at low pressure and high efficiency.

TABLE 1

| | Example 1 | Example 2 | Example 3 | Comparative Example 1 | Comparative Example 2 |
|---|---|---|---|---|---|
| Partition Membrane material | Teflon membrane[1] pore diameter 0.02 μm | Teflon membrane[2] pore diameter 0.2 μm | Polypropylene membrane[3] | Teflon membrane[1] pore diameter 0.02 μm | same to the left |
| Reaction medium | aqueous 0.2 M-$H_2SO_4$ + 0.05 mM-NaBr solution: 16 g | aqueous 0.1 M-HCl solution: 16 g | aqueous 0.2 M-$H_3PO_4$ + 0.1 M-NaCl solution: 16 g | aqueous 0.2 M-$H_2SO_4$ + 0.05 mM-NaBr solution: 16 g | same to the left |
| Catalyst | 5% Pd/activated carbon (powder)[4]: 8 mg | same to the left | Pd Black (powder)[5]: 40 mg | 5% Pd/activated carbon (powder)[4]: 8 mg | same to the left |
| Individual gas (A) line (kg/cm$^2$) | $O_2$ = 12 | same to the left | same to the left | $O_2/H_2/N_2$ = 6.0/1.2/4.8[6] | $O_2/H_2/N_2$ = 2.5/0.5/9.0[7] |
| Individual gas (B) line (kg/cm$^2$) | $H_2/N_2$ = 2.4/9.6 | same to the left | same to the left | $O_2/H_2/N_2$ = 6.0/1.2/4.8[6] | $O_2/H_2/N_2$ = 2.5/0.5/9.0[7] |
| Total pressure (kg/cm$^2$) | 12 | same to the left | same to the left | same to the left | same to the left |
| $H_2$ partial pressure (kg/cm$^2$) | 1.2 | same to the left | same to the left | same to the left | 0.5 |
| $O_2/H_2$ ratio | 5 | same to the left | same to the left | same to the left | same to the left |
| Formed hydrogen peroxide concentra- | 0.28 | 0.26 | 0.25 | 0.26 | 0.10 |

TABLE 1-continued

| | Example 1 | Example 2 | Example 3 | Comparative Example 1 | Comparative Example 2 |
|---|---|---|---|---|---|
| tion (%) | | | | | |

[1] polypropylene/Teflon laminate type membrane (polypropylene side facing the gaseous phase) manufactured by Japan Goatex Co.
[2] same to the above, manufactured by Advantech Toyo Co.
[3] Duraguard 2400, pore diameter 0.2 μm, manufactured by Polyplastics Co.
[4] Product of Nikki Chemicals Co.
[5] Product of N.E. Chemcat Co.
[6] Hydrogen concentration: 10 vol %, an explosive gaseous mixture
[7] Hydrogen concentration: 4 vol %, a non-explosive gaseous mixture

We claim:

1. A process for making hydrogen peroxide by catalytically reacting oxygen with hydrogen in a liquid reaction medium, which comprises
    (a) filling a reactor with a liquid reaction medium containing a catalyst,
    (b) dissolving oxygen and hydrogen in the liquid reaction medium by contacting the gases separately and simultaneously with the liquid reaction medium in the reactor,
    (c) thus forming hydrogen peroxide in the liquid reaction medium containing the catalyst,
    (d) while maintaining the reactor at such condition that a gaseous phase containing a combination of both oxygen and hydrogen is substantially absent during the reaction, and
    (e) separating the catalyst from the resulting reaction mixture containing hydrogen peroxide.

2. A process for making hydrogen peroxide according to claim 1, in which the liquid reaction medium is an aqueous medium.

3. A process for making hydrogen peroxide according to claims 1 or 2, in which the oxygen gas and hydrogen gas are separately and simultaneously contacted with the liquid reaction medium containing a catalyst, each through a membrane which is permeable to the respective gases but is substantially impermeable to the liquid reaction medium.

4. A process for making hydrogen peroxide according to claim 3, in which the membrane is a microporous membrane.

5. A process for making hydrogen peroxide according to claim 3, in which the membrane is a microporous membrane formed of a hydrophobic polymer.

6. A process for making hydrogen peroxide according to claim 1, in which the catalyst is a platinum group metal.

* * * * *